(12) United States Patent
Leiber (10) Patent No.: US 11,646,641 B2
(45) Date of Patent: May 9, 2023

(54) STATOR FOR ROTARY FIELD MACHINE HAVING AXIAL HEAT DISSIPATION

(71) Applicant: IPGATE Capital Holding AG, Pfäffikon (CH)

(72) Inventor: Thomas Leiber, Rogoznica (HR)

(73) Assignee: IPGATE CAPITAL HOLDING AG, Pfäffikon (CH)

( * ) Notice: Subject to any disclaimer, the term of this patent is extended or adjusted under 35 U.S.C. 154(b) by 0 days.

(21) Appl. No.: 16/967,936

(22) PCT Filed: Feb. 1, 2019

(86) PCT No.: PCT/EP2019/052507
§ 371 (c)(1),
(2) Date: Aug. 6, 2020

(87) PCT Pub. No.: WO2019/154731
PCT Pub. Date: Aug. 15, 2019

(65) Prior Publication Data
US 2021/0351668 A1    Nov. 11, 2021

(30) Foreign Application Priority Data
Feb. 7, 2018    (DE) .................. 10 2018 102 750.8

(51) Int. Cl.
*H02K 11/30*    (2016.01)
*H02K 9/22*    (2006.01)
(Continued)

(52) U.S. Cl.
CPC ............... *H02K 11/30* (2016.01); *H02K 1/20* (2013.01); *H02K 9/20* (2013.01); *H02K 9/223* (2021.01);
(Continued)

(58) Field of Classification Search
CPC ......... H02K 9/06; H02K 9/223; H02K 1/2786
(Continued)

(56) References Cited

U.S. PATENT DOCUMENTS 6,201,321 B1    3/2001  Mosciatti et al.
6,509,665 B1    1/2003  Nishiyama et al.
(Continued)

FOREIGN PATENT DOCUMENTS

CN    102810964 A    12/2012
CN    102969850 A    3/2013
(Continued)

OTHER PUBLICATIONS

Machine Translation DE102013101084 (Year: 2014).*
(Continued)

*Primary Examiner* — Jose A Gonzalez Quinones
(74) *Attorney, Agent, or Firm* — Panitch Schwarze Belisario & Nadel LLP (57) ABSTRACT

A stator of an external rotor motor supports a plurality of excitation windings. At least one heat dissipation means is provided, for discharging heat in an axial direction. The heat dissipation means contacts the end face of at least one excitation winding or a potting compound or insulation enclosing the excitation winding and is also connected to a heat sink, in the form of the stator carrier, a cooling element and/or a housing, for removing the heat.

21 Claims, 9 Drawing Sheets

(51) Int. Cl.
*H02K 1/20* (2006.01)
*H02K 9/20* (2006.01)
*H02K 16/04* (2006.01)

(52) U.S. Cl.
CPC ............. *H02K 9/227* (2021.01); *H02K 16/04* (2013.01); *H02K 9/225* (2021.01)

(58) Field of Classification Search
USPC .......................................... 310/54, 66, 68 C
See application file for complete search history.

(56) References Cited

U.S. PATENT DOCUMENTS

| | | | |
|---|---|---|---|
| 8,487,500 B2 | 7/2013 | Cullen et al. | |
| 8,513,842 B2 | 8/2013 | Iwasaki et al. | |
| 8,754,568 B2 * | 6/2014 | Kim | H02K 16/02 |
| | | | 310/254.1 |
| 2003/0141778 A1 | 7/2003 | Caamano | |
| 2007/0122293 A1 | 5/2007 | Sugiyama et al. | |
| 2011/0037338 A1 | 2/2011 | Leiber et al. | |
| 2012/0306297 A1 | 12/2012 | Kim et al. | |
| 2018/0175705 A1 | 6/2018 | Festa et al. | |

FOREIGN PATENT DOCUMENTS

| | | | | |
|---|---|---|---|---|
| CN | 105981272 A | | 9/2016 | |
| CN | 106130215 A | | 11/2016 | |
| DE | 10258778 A1 | | 7/2004 | |
| DE | 112010005507 T5 | | 3/2013 | |
| DE | 102013101084 A1 | * | 8/2014 | ........... H02K 1/2786 |
| DE | 102013101084 A1 | | 8/2014 | |
| DE | 102015218929 A1 | | 3/2017 | |
| DE | 102017004109 A1 | | 11/2017 | |
| EP | 2179488 B1 | | 5/2012 | |
| EP | 3091637 A1 | | 11/2016 | |
| EP | 3091637 A1 | * | 11/2016 | ............. H02K 1/187 |
| JP | 08298752 A | * | 11/1996 | |
| JP | H08298752 A | | 11/1996 | |
| JP | 2011109808 A | | 6/2011 | |
| WO | 2000001053 A1 | | 1/2000 | |
| WO | WO2006069893 A1 | * | 7/2006 | |
| WO | WO-2006069893 A1 | * | 7/2006 | ............... H02K 3/38 |
| WO | 2010099974 A2 | | 9/2010 | |
| WO | 2010099975 A2 | | 9/2010 | |
| WO | 2014117881 A1 | | 8/2014 | |
| WO | 2017187296 A1 | | 11/2017 | |

OTHER PUBLICATIONS

Search Report dated Jan. 24, 2019 in DE Application No. 10 2018 102 750.8.
Int'l Search Report and Written Opinion dated May 3, 2019 in Int'l Application No. PCT/EP2019/052507.
Office Action dated Feb. 9, 2022 in Chinese Application No. 201980012363.8.
Second Office Action dated Sep. 15, 2022 in CN Application No. 201980012363.8 (with English Translation).

* cited by examiner

STATOR FOR ROTARY FIELD MACHINE HAVING AXIAL HEAT DISSIPATION

CROSS-REFERENCE TO RELATED APPLICATION

This application is a Section 371 of International Application No. PCT/EP2019/052507, filed Feb. 1, 2019, which was published in the German language on Aug. 15, 2019 under International Publication No. WO 2019/154731 A1, which claims priority under 35 U.S.C. § 119(b) to German Patent Application No. 10 2018 102 750.8, filed Feb. 7, 2018, the disclosures of which are incorporated herein by reference.

The present invention relates to a stator of a rotating-field machine, wherein the stator bears multiple exciter coils.

PRIOR ART

Known rotating-field machines or electric motors are generally designed as permanently excited internal-rotor or external-rotor motors. These are increasingly used as an electrical drive motor of two-wheeled vehicles, passenger motor vehicles, heavy goods vehicles, and in propeller-driven drive systems in the maritime sector and in aviation. In particular in the case of vehicles, ships and also more recently electric aircraft which are driven using batteries or lithium-ion batteries, efficiency is the primary design parameter, because the efficiency primarily determines the size of the battery and thus the overall costs. It is however also necessary for the costs of the electric motor to be taken into account in the overall consideration, for which reason cost-efficient use of a wide variety of materials is necessary and relevant. In the aviation sector, in particular in the case of electrically driven aircraft, not only the efficiency but also the power density must be taken into account, for which reason the use of permanent magnets is generally preferred.

In order to achieve high efficiency and power density, various measures for reducing losses are implemented in addition to the use of permanent magnets. A distinction is made between copper losses in the coils, the iron losses in all iron-containing motor components relevant to the magnetic circuit, and the friction losses in the bearings.

In order to reduce copper losses, the single-tooth technique and winding of single teeth or double teeth are favored. With the single-tooth winding technique, the exciter coil can be wound in a precise manner, whereby the copper filling level in electric motors is increased. In the case of external-rotor motors, aside from the single-tooth technique, use is also made of a winding technique with a flexural stator, as described in EP 2179488 B1.

In order to reduce iron losses, use is made of laminated stators with a small lamination thickness, in particular Si—Fe laminations with lamination thicknesses <=0.3 mm, and laminated rotors and optionally, in order to reduce the eddy current losses, also fragmented permanent magnets. Furthermore, use is increasingly made of materials with high temperature resistance, in particular permanent magnets with high remanence and at the same time high coercivity field strength $H_{CJ}$. This high temperature resistance leads to very high costs, because, for example, such permanent magnets have a high dysprosium fraction. Furthermore, stator laminations with very low losses (lamination thickness 0.1-0.2 mm) or high degree of saturation (for example cobalt-iron laminations) are very expensive.

However, the prior art has disclosed few approaches addressing how the power of the motor can be increased through highly efficient heat conduction for the purposes of increasing the heat dissipation of the motor.

For example, in WO 2010/099974, a double rotor with a highly complex water-type cooling arrangement is realized. The cooling channels are realized in an injection molding process using thermosetting plastic, and run between the exciter coils from the housing to the winding head, and are diverted at the winding head. Such cooling is extremely expensive and furthermore not optimal, because winding space for copper coils is lost.

Another approach for heat conduction is realized in WO2010/099975. In the case of this double-rotor motor, the stator is encapsulated by injection molding with a thermosetting plastic material with good heat conductivity characteristics. At the same time, in the selection of the thermosetting plastic material, importance must be attached to stiffness, because the encapsulation of the stator by injection molding substantially contributes to the stability of the cantilevered stator during operation. Furthermore, it is disclosed in WO2010/099975 that, by means of the potting and the good heat conductivity characteristics of the thermosetting plastic material, the heat transfer from the winding head of the exciter coils to the housing can be improved.

The solution disclosed in WO2010/099975 however has certain weaknesses. Firstly, in the case of injection molding using thermosetting plastic, consideration must be given primarily to the strength, and it is thus not possible, in the selection of the material, to attach importance exclusively to the heat conductivity characteristics. Furthermore, with a material with simultaneously high strength and high heat conductivity, the method is very expensive, because the entire stator obtains its final stability and heat conductivity for the first time in the thermosetting plastic injection molding process. The stator teeth must be fixed in a very solid manner during the injection molding process because high injection pressures are used in the case of thermosetting plastic injection molding. Furthermore, a high level of material use with very expensive fillers (heat conductors, for example boron nitride, strength-improving materials, such as for example carbon fibers or glass fibers) is necessary. Finally, the concept of the double-rotor motor, owing to the principle, allows heat conduction only in one direction.

To optimize the electrical insulation of the stator teeth, use is commonly made of stator tooth end pieces composed of plastic, wherein then, the insulation of the central region is realized by means of a thin Kapton film with acceptable conductance (0.12-0.3 W/mK) and sufficient dielectric strength >2 kV. Owing to the thin-walled nature of the Kapton film, it is however possible for more heat to be transferred via this heat path. Owing to the thin film, the heat path from the exciter coil to the stator is reduced, and the copper filling ratio is increased, because the thin-walled Kapton film allows more space for the copper coils in the winding window. This insulation technique is however used primarily to improve the copper filling ratio of the electric motors. It does not result in improved cooling performance, because the coil normally does not bear against the Kapton film and thus a certain air gap is situated between the hot coil and the heat-dissipating Kapton film and the exciter coil, which arises owing to the lack of precision in the winding technique.

OBJECT OF THE INVENTION

It is an object of the invention to improve the heat dissipation from the coils via the stator tooth or stator and reduce the weight of the stator.

Said object is achieved according to the invention by means of a stator of an external-rotor motor, the stator of which bears multiple exciter coils and has at least one heat-conducting means provided for heat dissipation in an axial direction, wherein the heat-conducting means lies against the end side of at least one exciter coil or against a potting compound or insulator surrounding the exciter coil and is furthermore connected to a heat sink, in particular in the form of the stator carrier, cooling body or housing, for the dissipation of the heat.

Through the provision according to the invention of heat-conducting means which lie against the end side of the exciter coils, heat is advantageously dissipated from the exciter coil also in an axial direction, whereby the heat dissipation is considerably improved and thus the performance of the rotating-field machine equipped with the stator is improved.

Owing to the maximum limit of the operation of particular materials, such as for example copper coils, with a typical maximum temperature of 180° C., the maximum continuous power of an electric motor is limited by the temperature of the heat sink and by the temperature difference in the exciter coil. If the thermal conductance between coil and heat sink is halved, this leads to an increase in power by approximately a factor of 1.5 to 2. The efficient dissipation of heat is therefore of particular importance.

It is furthermore advantageous either if the heat-conducting means is forced against the exciter coil by means of a spring, wherein in this case, for example, the spring is supported against the stator carrier, cooling body or housing directly or via intermediate parts, or else the electrically insulating heat-conducting means can be pressed against the exciter coil by means of a screw thread, wherein, in the latter case, said heat-conducting means can for example be screwed into a bore with internal thread of the stator carrier, cooling body or housing. The heat-conducting means, in particular of the screw solution, is composed of two parts: (a) an insulating head piece preferably composed of boron nitride, silicon carbide or ceramic, and (b) a carrier composed of aluminum. The electrical insulation is realized by means of the head piece, and the heat conduction is realized by means of the rest.

In addition to the heat-conducting means which lie axially against the exciter coils and which dissipate heat in an axial direction, it is also possible for intermediate elements to be arranged between the stator teeth or tooth groups which are formed by two stator teeth and which in particular form U-shaped yokes. Said intermediate elements may merely be placed between the stator teeth or tooth groups, or else may also serve for the connection thereof. Thus, said intermediate elements may in particular be arranged where no or no significant magnetic flux flows, such that said intermediate elements do not adversely impede said magnetic flux. For this reason, the intermediate elements may also be manufactured from a different material than the stator teeth or those regions or parts which form the magnetic return between the stator teeth.

Here, the intermediate elements advantageously extend in an axial direction along the stator and can advantageously serve for heat dissipation in an axial direction out of the stator. Said intermediate elements may also be manufactured from a different material than the stator teeth, which in particular conducts the heat more easily and/or more effectively than the material of the stator teeth. The material of the intermediate elements advantageously has a heat conductivity $\lambda 2$ higher than that of iron (80 W/mK) of at least 150 W/mK (for example heat conductance of magnesium), in particular higher than 200 W/mK (heat conductance of aluminum). It is thus advantageously produced from aluminum or magnesium or an alloy of these materials.

The stator according to the invention advantageously has a number of N stator teeth which together form a number of N/2 tooth groups $ZG_{i=1 \ldots N/2}$, and each stator tooth has in each case one pole core and one pole shoe integrally formed thereon. Here, in each case two directly adjacently arranged stator teeth form one tooth group $ZG_i$, which, together with a magnetic return means arranged between the two stator teeth of the tooth group or formed in one piece therewith, are constituent parts of a magnetic circuit. The above-described intermediate elements are in this case arranged between two adjacent tooth groups.

It is likewise possible for the stator teeth or tooth groups to be connected to one another via webs, wherein the webs have a smaller cross-sectional area than the connecting region, which forms the magnetic return, between two stator teeth. In the case of such an embodiment, the intermediate elements lie between the winding wires of the exciter coils, the stator teeth and the webs, and lie against these. It is likewise possible for the stator teeth or tooth groups to be arranged on or fastened to an inner ring, wherein then, the intermediate elements lie against the inner ring, the stator teeth and the exciter coils or against an additional heat-conducting element arranged between these.

It is likewise possible that, in the case of the possible embodiments described above, at least one further heat-conducting element is additionally arranged between exciter coil and stator tooth, which at least one further conducting element may in particular also be in contact with the intermediate element for the purposes of heat transfer. This additional heat-conducting element may serve not only for the heat dissipation in a circumferential direction but also for radial heat dissipation from the exciter coil, wherein this occurs radially inwardly to the heat-dissipating intermediate element. Here, the additional heat-conducting element extends likewise in an axial direction of the stator and may advantageously be a molded piece with a heat conductivity of greater than 5 W/mK.

In all embodiments described above, it is the case that, in and/or on the intermediate element, there may be arranged at least one heat-conducting means, in particular in the form of a water channel of a water-type cooling arrangement or of a heatpipe, which heat-conducting means extends in an axial direction of the stator and likewise serves for the dissipation of heat in an axial direction. The heat-conducting means in the form of a heatpipe may also be in contact with an additional cooling body. If a water-type cooling or fluid-type cooling arrangement is present in the stator, the fluid flowing through the intermediate element will flow through or along the cooling body for the purposes of heat dissipation.

Alternatively, use may also be made of a heatpipe in the form of a classic heatpipe with a hermetically encapsulated volume which is filled with a working medium (for example water or ammonia). By means of heatpipes, the heat dissipation can be improved yet further by a factor of more than 100, in particular a factor of 1000, than in the case of solid pins, such as for example copper, being used.

In addition, in all of the embodiments described above, the space between the windings of the exciter coils in the winding grooves may be potted with an additional potting compound, which has in particular a thermal conductivity of at least 0.25 W/mK. The potting is in particular advantageously performed such that there are no longer any air inclusions between the coil wires of the windings, which likewise results in very good heat dissipation from the exciter coils to the stator tooth and the axial heat-conducting elements or means.

The stator according to the invention may also be designed either such that the stator teeth or the tooth groups are pushed in an axial direction onto a stator inner ring, in particular are held thereon by means of dovetail guides, or such that a stator tooth engages radially into a recess of the inner ring and is held in position by means of an intermediate element of wedge-shaped cross section.

It is also possible that, in or on the stator carrier and/or the inner ring or an additional support ring (OT), there is arranged at least one channel, which extends in particular in an axial direction parallel to the stator teeth, for a water-type cooling arrangement and/or at least one heatpipe. In this way, the heat dissipation in an axial direction can be additionally further increased, and thus the performance of the rotating-field machine can be increased.

It is self-evident that a rotating-field machine with an above-described stator is also a subject of the invention and is claimed. Here, the stator carrier may be arranged or fastened on a housing of the rotating-field machine directly or via an intermediate part. Additionally, a cooling body may also be arranged on the stator carrier, wherein then, the heatpipe or the water-type cooling arrangement transports heat to the cooling body and, via this, releases said heat to the housing or to the surroundings. Also, in the case of a rotating-field machine according to the invention, an electronics module may be provided which is arranged in or on the housing of the rotating-field machine and which is advantageously also in contact with the cooling body. The housing of the rotating-field machine may self-evidently also be formed at least partially as a cooling body with a correspondingly large surface for the release of heat. It is also possible for only certain electronics components, such as for example the power electronics, to release their heat directly to the cooling body. It self-evidently likewise falls within the scope of the invention for the rotating-field machine or the stator according to the invention to have multiple cooling bodies.

Multiple possible embodiments of the stator according to the invention and of possible rotating-field machines will be discussed below on the basis of drawings.

Figure 1:
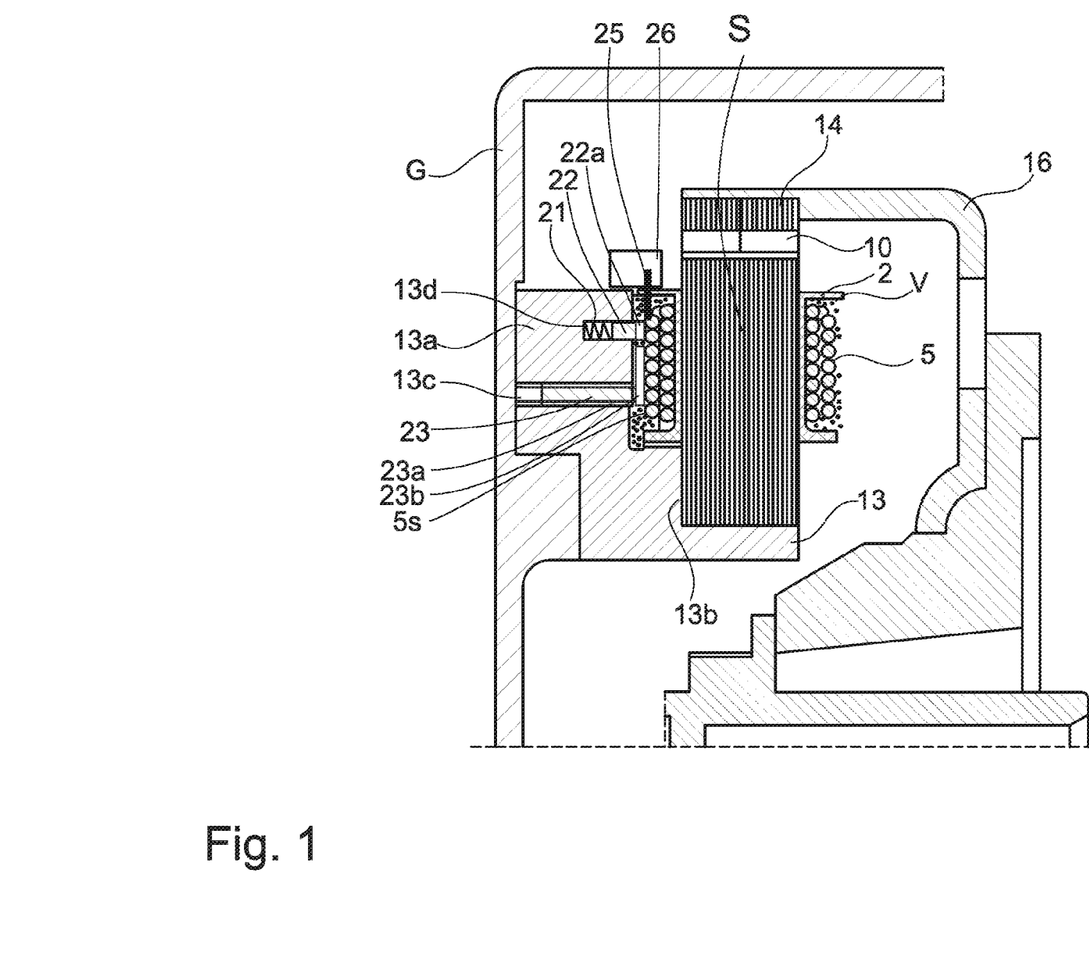
FIG. 1: shows a rotating-field machine with a first possible embodiment of a stator according to the invention with heat-conducting means lying axially against the exciter coils.

FIG. 1 shows a rotating-field machine with a first possible embodiment of a stator S according to the invention with heat-conducting means 22, 22a and 23a, 23a, 23b lying axially against the exciter coils. Here, the heat-conducting means 22, 22a is composed of a heat-conducting annular plate 22a which is fastened to a main body 22 manufactured for example from metal. It is however also possible for the heat-conducting means to be composed only of a heat-conducting body 22a, wherein the main body 22 can then be omitted. By means of a spring 21 which lies together with the heat-conducting means, or the main body 22 thereof, in a recess 13d, in particular in the form of a blind hole, of the stator carrier 13 and is supported against the base thereof, the heat-conducting means 22, 22a is pressed axially against the exciter coil 5. Alternatively or in addition, the heat-conducting means 23 may be provided, which is equipped with an external thread 23a by means of which it can be screwed into the internal bore with internal thread 13c of the stator carrier 13 and can be pressed by way of its heat-conducting annular plate or plates 23b axially against the exciter coil 5 or the insulator or potting material V thereof.

By means of the thread 23a, it is advantageously possible for a high pressure to be applied to the exciter coil 5, such that the winding wires thereof can be pressed closely against one another, whereby good heat transfer can be realized. It is self-evident that in each case at least one heat-conducting means 22, 22a, 23, 23a, 23b may be provided in each case in the region of a stator tooth in a circumferential direction of the stator. The exciter coil is wound on a winding carrier 2 which simultaneously forms the electrical insulator and which may optionally also be designed for transporting heat from the exciter coil to the stator tooth 1 or further heat-conducting means 11, 21, 31, 31'. Possible embodiments of the winding carrier 2 and of the further possible heat-conducting means 11, 21, 31, 31' for improved heat transport are illustrated in FIGS. 3 to 8 and described in more detail on the basis of these.

The stator carrier 13 is arranged on the inner side of the housing G and fastened thereto. The internal stator S is furthermore surrounded by the potshaped rotor 16 which, on its cylindrical inner wall, bears a laminated magnetic return 14 and permanent magnets 10. The bearing arrangement of the rotor in the housing G is not illustrated and may be of any desired design.

Figure 2:
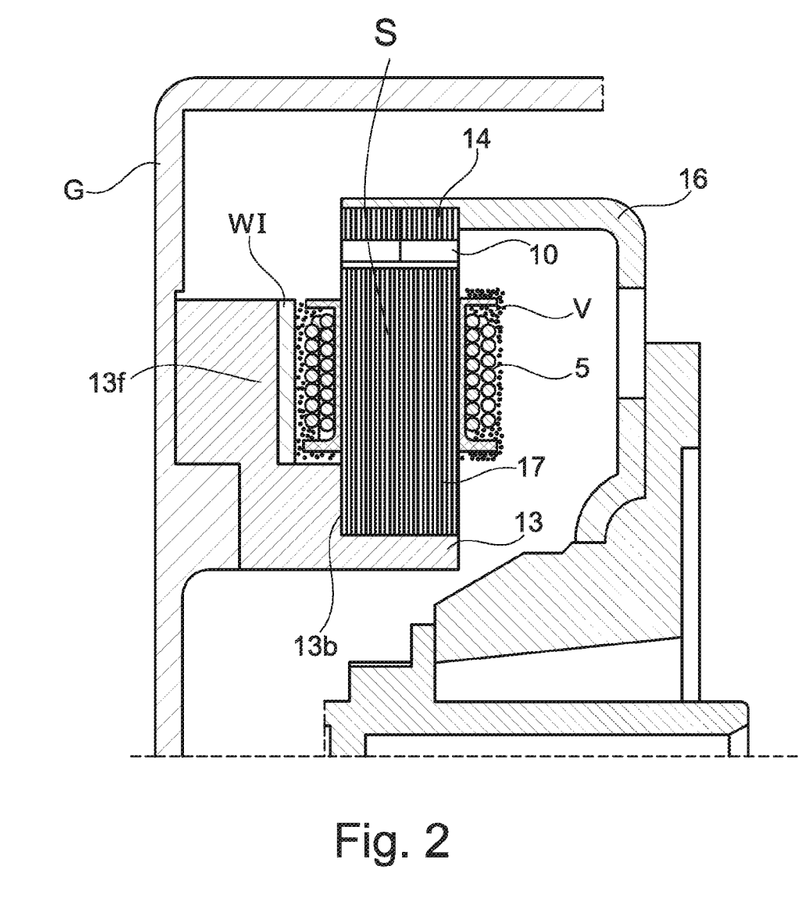
FIG. 2: shows a further possible configuration of heat-conducting means lying axially against the exciter coils.
Figure 2A:
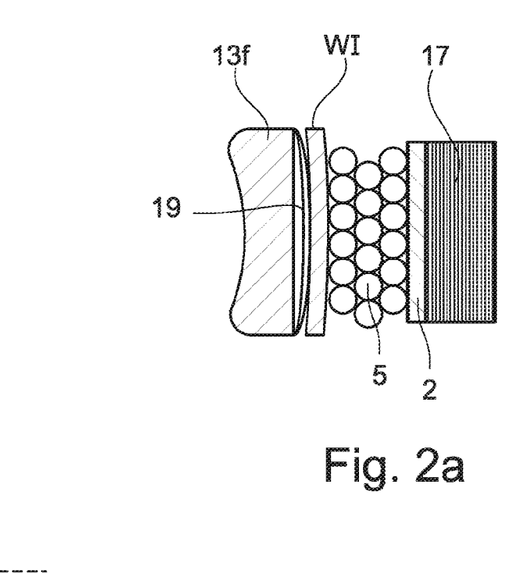
FIG. 2a: shows an enlarged detail from FIG. 2.

FIG. 2 shows a further possible embodiment of heat-conducting means WI lying axially against the exciter coils. Here, as in the enlarged detail as per FIG. 2a, the heat-conducting means WI is preferably an annular plate composed of a material with very good heat conductivity, which is pressed against the axial end side of the exciter coil 5 or the potting compound V thereof over a large area preferably by means of a spring composed of highly conductive material (for example aluminum, steel) 19, which spring is supported against the region 13f of the stator carrier 13.

The spring may also be omitted, as illustrated in FIG. 2. In this case, in accordance with the winding quality, corresponding wedge-shaped plates with a radius, for example two half-shells, are pushed into the region between winding head and stator carrier and are subsequently potted. These disks may also be adapted in terms of thickness, for example for the quality of the winding or may have differently geometrical thicknesses for different numbers of windings of a motor. It is thus possible for the spacing to be minimized and the heat transfer to be optimized. In this case, potting of the stator with the heat-conducting means WI and the region 13*f* of the stator carrier is imperative. Slight exertion of pressure on the winding is also thus possible because the heat-conducting means has an insulating action and thus does not cause any breakdown. Here, in a circumferential direction, it is again possible for in each case at least one heat-conducting means WI to be provided per stator tooth in each case. Otherwise, the rest of the construction of the rotating-field machine is very similar to that of the rotating-field machine illustrated in FIG. 1.

Figure 3:
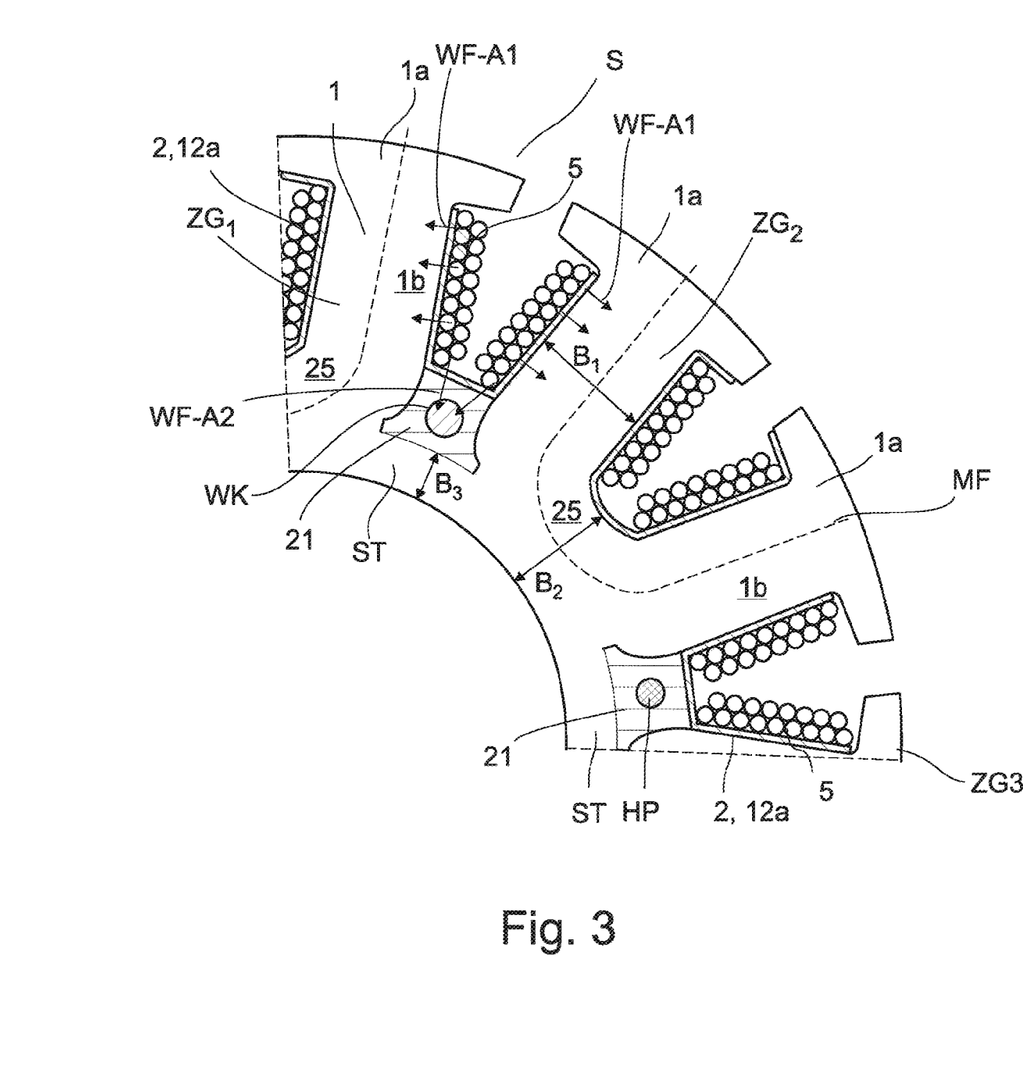
FIG. 3: shows a part of the cross section through a first possible embodiment of an internal stator according to the invention with tooth groups connected by means of webs.

FIG. 3 shows a part of the cross section through an internal stator S according to the invention of an external-rotor motor according to one possible embodiment, wherein the heat flow directions WF-A1, WF-A2 are indicated by means of arrows.

In the case of the internal stator S, in each case two adjacent stator teeth 1 form in each case one tooth group $ZG_i$. Here, a tooth group $ZG_i$ forms a substantially U-shaped yoke. Here, the tooth groups $ZG_i$ are in each case connected to one another by means of webs ST extending in an axial direction AX.

The intermediate elements 21 have the task of increasing the cooling power and are thus advantageously composed of a material with good thermal conductance. If the intermediate element 21 is composed of an electrically conductive material, it must also be separately insulated in relation to the coil 5, which may be realized for example by means of insulation material, insulators and/or additional heat-conducting elements. By means of the intermediate elements 21, it is furthermore possible for the weight of the internal stator S to be reduced. It is also possible for the heat conduction to occur directly from the coil 5 to the intermediate element 21 if an additional element with good thermal conductivity is arranged between exciter coil 5 and pole core 1*b*. An advantage of these intermediate elements 21 is that, here, a material can be used which has much more favorable thermal conductances than the stator lamination situated there in the standard case. Further parallel heat paths WF-A1 and WF-A2 are thus realized instead of only from the coil 5 to the stator tooth 1 and from there to the housing of the rotating-field machine.

Here, each stator tooth 1 is composed of the pole core 1*b* and the integrally formed pole shoe 1*a*, wherein the stator teeth 1 of a tooth group $ZG_i$ are connected to one another by the magnetic return means 25. Here, the stator teeth 1 of a tooth group may be formed by U-shaped stator laminations. The coils 5 are electrically insulated from the stator teeth 1 by means of a suitable insulator 2, 12*a*, wherein the insulator 2 or the heat-conducting means 12*a* can serve for the dissipation of heat from the coils in the direction WF-A1 of the stator tooth 1.

The stator teeth 1 and magnetic returns 25 are manufactured from a first, in particular ferromagnetic material MA1. The intermediate elements 21 are manufactured from a second, different material MA2, which is in particular lighter and/or has better conductance than the first material MA1. The stator teeth of a tooth group form, together with their magnetic return element 25, a u-shaped yoke, which forms a part of the magnetic circuit MF. The region 25 which connects the stator teeth 1 of a tooth group $ZG_i$ to one another forms the magnetic return and has a radial width $B_2$ which corresponds to the width $B_1$ of the pole cores 1*b*. The radial width $B_3$ of the webs ST is significantly smaller than the width $B_2$, wherein the region thus freed up between web ST and exciter coil 5 is utilized for the intermediate element 21. The widths B1 and B2 are equal if a non-anisotropic material is used. B2 is greater than B1 if an anisotropic material with preferred magnetic direction is used in the pole core 1*b*.

The external rotor (not illustrated) may for example be equipped with permanent magnets.

Either a water-type cooling circuit WK and/or heatpipes HP may be integrated into the intermediate elements 21, which water-type cooling circuit or heatpipes extend in an axial direction and are connected to a heat exchanger or cooling body respectively, which may be arranged for example axially adjacent to the internal stator S. The heatpipes HP may also be formed by molded elements with very good heat conductivity, for example copper or ceramic pins, by means of which the heat-conducting characteristics are further improved in relation to the non-ferromagnetic basic material of the intermediate elements. The axial heat conduction in particular is optimized by means of said pins, which is of particular importance in the configuration of an external-rotor motor for the dissipation of heat.

Alternatively, use may also be made of a heatpipe in the form of a classic heatpipe with a hermetically encapsulated volume which is filled with a working medium (for example water or ammonia). By means of heatpipes, the heat dissipation can be improved yet further by a factor of more than 100, in particular a factor of 1000, than in the case of solid pins, such as for example copper, being used.

Figure 4:
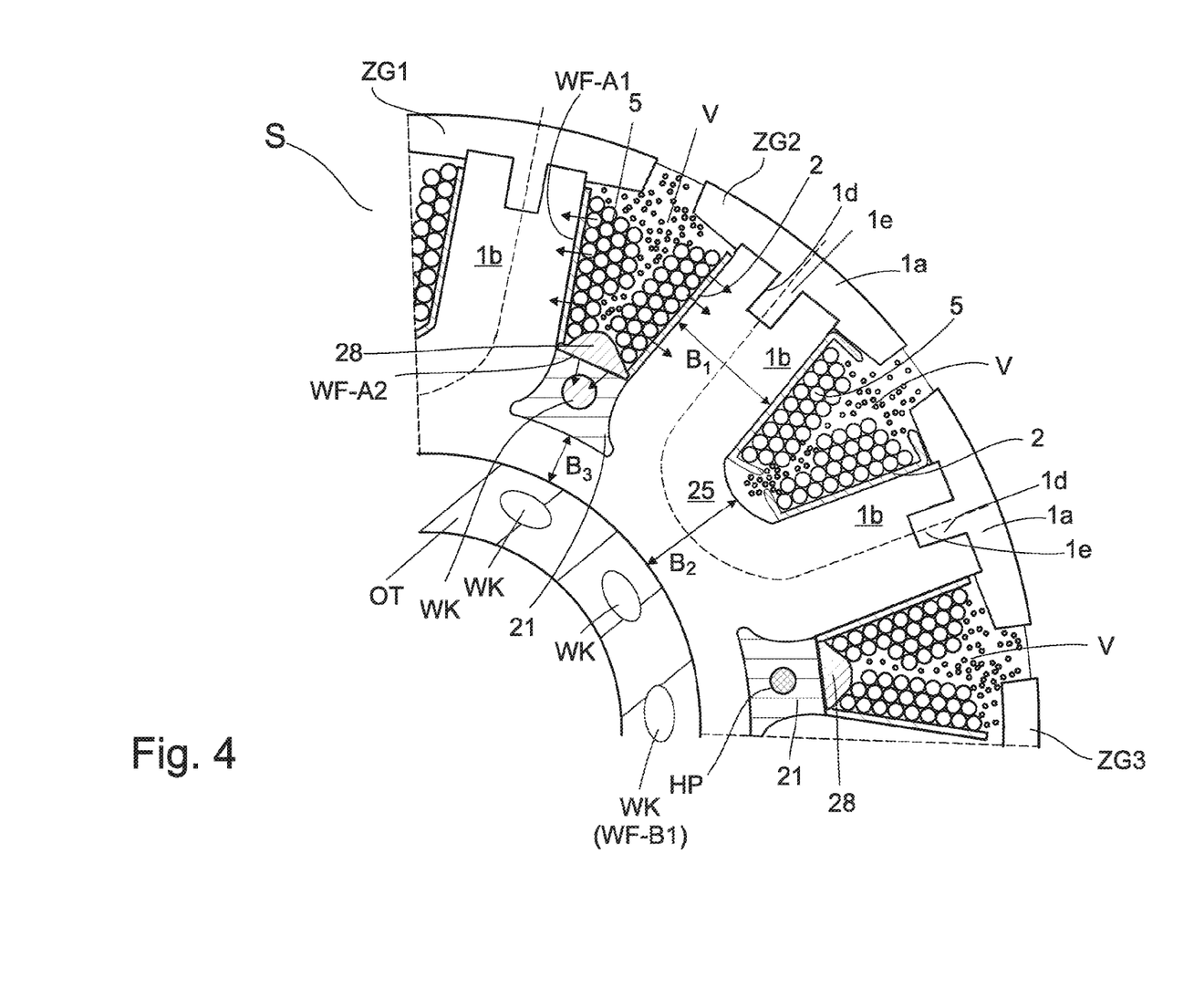
FIG. 4: shows a possible modification of the internal stator as per FIG. 3 with separately manufactured pole shoes which has been potted with a potting compound, wherein an additional optional inner ring with or without water-type cooling arrangement may be provided.

In the embodiment illustrated in FIG. 4, by contrast to the embodiment illustrated and described in FIG. 1, the pole shoes 1*a* which are required for a sinusoidal configuration of the magnetic flux are manufactured separately and, after the pole cores 1*b* have been equipped with the exciter coils 5, are mounted onto the stator core 1*b*. It is thus possible for individual coils 5 with corresponding optimized layer configuration to be pre-wound with an ideal winding technique. Here, it is even possible for coils with more than two coil layers to be provided in a dimensionally accurate manner. These may be realized on coil carriers 2, which are then pushed on radially, or in the form of exciter coils 5 without winding bodies, which are mounted onto the stator core 1*b* that has previously been encapsulated by injection molding or insulated. After the equipping process, the pole shoes 1*a* are pressed on or adhesively bonded on. If the stator, after being enwound, is potted (potting compound V), no particularly high demands are placed on the press-fit connection or adhesive connection, because the pole shoe 1*a* is stabilized as a result of the potting process.

This embodiment is therefore expedient for optimizing the copper filling ratio in that the coils can, in accordance with the winding form, be pushed successively onto the one stator without pole shoes, wherein, firstly, the exciter coils with (n+x) layers, or a wedge shape adapted to the winding geometry, are pushed onto every second stator tooth 1*b*, and then the exciter coils with (n) layers are pushed onto every second adjacent yoke tooth, such that no contact is made with the exciter coils during the pushing-on process.

Furthermore, the stator core 1*b* is already provided with an insulator prior to the pushing-on process, as discussed in FIGS. 4 to 7. Alternatively, the coil may also be wound onto a winding body and pushed with the winding body onto the tooth.

In this embodiment, the U-shaped yokes 1*b*, 25 are formed in one piece with the webs ST which connect the individual tooth groups $ZG_i$ to one another. The same conditions for $B_1$, $B_2$ and $B_3$ as described in FIG. 1 apply here also.

Additionally, an inner ring OT may additionally be inserted or arranged for the purposes of reinforcement and/or cooling of the stator S, which inner ring lies radially at the inside against the tooth groups $ZG_i$ and the webs ST, in particular in a fully areal manner, such that a good heat transfer can occur. It is optionally also possible for active cooling by means of a fluid, for example a water-type cooling arrangement WK, or passive cooling by means of heatpipes HP (not illustrated), to occur in this additional ring OT. Here, the heat may occur via the cooling arrangement WK to a cooling body arranged for example axially adjacent to the stator, as illustrated for example in FIG. 7, or to the stator carrier 13 or the housing G.

Figure 5:
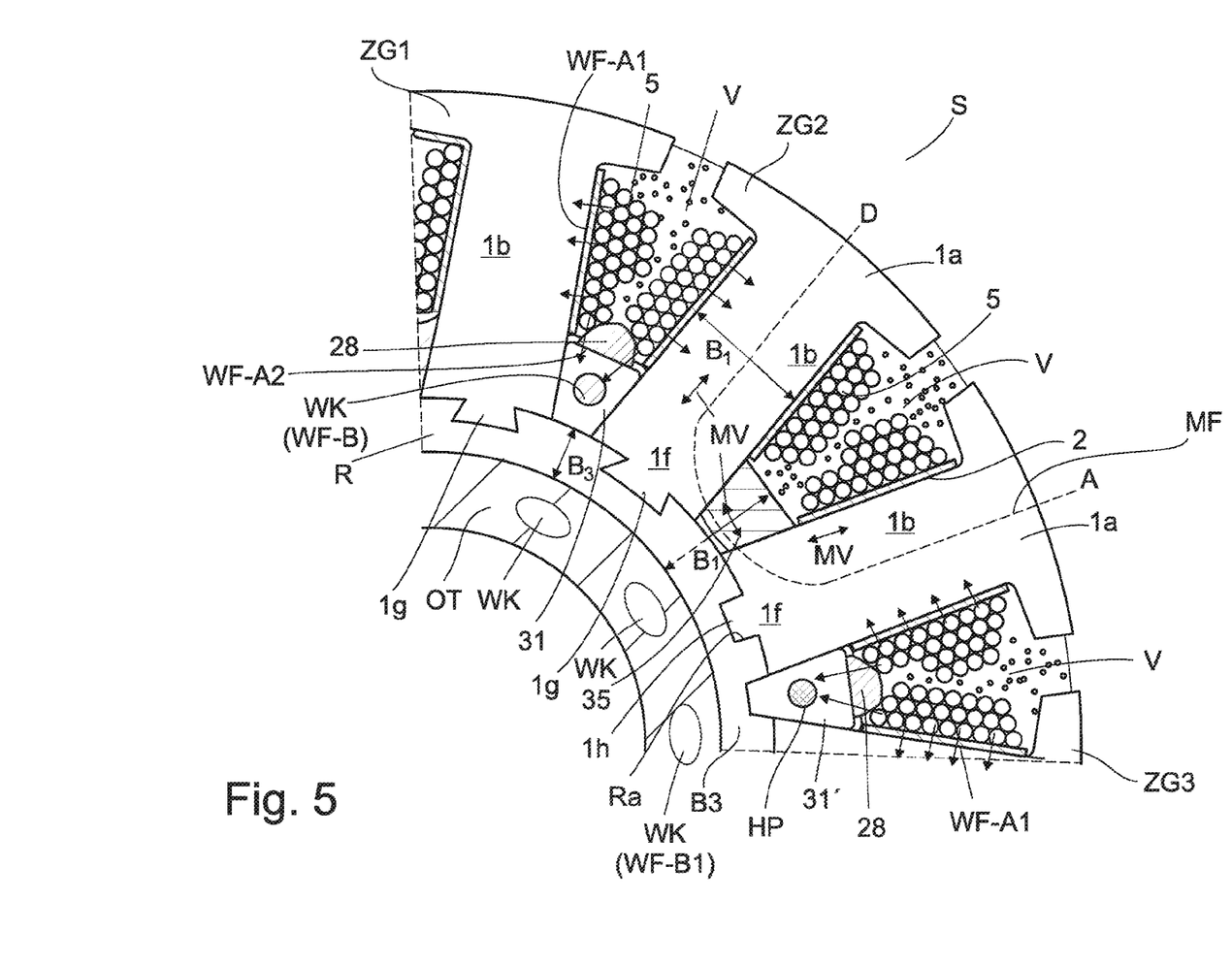
FIG. 5: shows a further possible configuration of an internal stator with inner ring and stator teeth fastened thereto, wherein, in this case, too, an additional optional inner ring with or without water-type cooling arrangement may be provided.

FIG. 5 shows a further possible embodiment of the multi-part internal stator S. In this embodiment, the individual stator teeth 1 are arranged with their ends 1f on an inner stator inner ring R, or are connected for example by means of a dovetail guide 1g. In this embodiment, too, in each case two adjacently arranged stator teeth form in each case one tooth group $ZG_i$. Here, between the stator teeth of a tooth group $ZG_i$, there is arranged in each case one magnetic return means 35, via which the magnetic circuit MF of the respective tooth group is closed. If the stator inner ring R is manufactured from a ferromagnetic material, a part of the magnetic flux can also flow via the stator inner ring R. Preferably, the magnetic return means 35 may be a laminated core with an anisotropic preferred direction in a flux direction. Preferably, the widths $B_1$ and $B_2$ should be equal.

The water-type cooling arrangement WK or heatpipe HP arranged in the intermediate elements 31, 31' runs in an axial direction through the internal stator S and forms the heat path WF-B.

Between the U-shaped yokes, which form in each case one tooth group $ZG_i$, there is in turn arranged an intermediate element 31, 31', which serves as heat-conducting element. This embodiment offers the possibility, by contrast to the embodiments of FIGS. 1 and 2, of insulating and enwinding the individual teeth 1 in advance. Here, the stator insulation technique with heat-conducting characteristics of the embodiments of FIG. 7a to FIG. 10 may be implemented, and the exciter coils may be implemented with a maximum filling ratio with optionally uneven winding of the neighboring teeth. The number of windings of adjacent teeth preferably differs for the purposes of optimizing the filling ratio, but necessitates that the adjacent teeth are interconnected in series. It is thus possible for the coils to be wound differently with the same round copper wire, for example one coil with 3 layers and the adjacent coil with 4 layers, or with different geometrical forms.

The stator inner ring R may be formed as a laminated core or as a heat conductor. If it is formed as a ferromagnetic conductor, this can serve for the optimization of the thickness $B_2$ or the configuration of the magnetic return means 35. Also, an adaptation of the contour in the region of the heat-conducting element 31 is possible, because this region contributes only little to the heat conduction.

It is in particular also possible for the stator cores 1b to merely be inserted with a projection 1h into a radial recess Ra of the stator inner ring R. In this case, the intermediate elements 31 are of wedge-shaped form and are held in position in a radial direction by the coils 5, the filler material F, etc. By means of the wedge shape, in turn, the stator teeth 1 are held fixedly on the stator inner ring R.

Optionally, in the case of the internal stator S illustrated in FIG. 3, an additional inner ring OT may be provided, which, in the context of improved axial heat conduction, is preferably produced from aluminum, provides the internal stator with even greater stability, and may optionally also have channels for a water-type cooling arrangement WK, wherein the channels for the water-type cooling arrangement WK extend in an axial direction through the internal stator S and form a heat path WF-B1, via which the heat is dissipated in an axial direction.

For the above-described embodiments, it is the case that the width $B_1$ of the stator tooth 1 and the thickness $B_2$ of the magnetic returns 25, 35 must be dimensioned such that the magnetic flux is not impeded. For the flux guidance, use may be made of anisotropic material with different preferred magnetic direction. If the U-shaped yokes 1b, 25 are connected at the inside to a ring R, said ring R or inner region may also make a small contribution to the magnetic flux, but primarily has the purpose of increasing the stability of the internal stator S and may be of very thin-walled form, such that $B_3$ may for example also be configured to be less than <3 mm. This is self-evidently dependent in each case on the size of the rotating-field machine. The lower limit of the thickness $B_3$ is determined by an economical manufacturing method and by stiffness requirements. If the stator S is potted, the requirements on strength are low, such that the thickness $B_3$ can be minimized. As already stated, it is then expediently possible for intermediate elements 21, 31, 31' as heat-flow-guiding elements with integrated heatpipes HP or water-type cooling circuits WK or pins or materials with very high thermal conductivity, for example copper or ceramic pins or molded elements, carbon nanotubes etc., which extend in an axial direction of the stator S, to be provided in the area that is freed up. As already described, these intermediate elements can be used for efficient axial cooling in a weight-optimized manner. These intermediate elements 21, 31, 31' are furthermore arranged in a region which cannot be utilized for the copper coils, and thus contributes to a thermal optimization of the stator.

The described construction of the internal stator S may, before the enwinding with the exciter coils 5, be equipped in advance with an insulator 2 for the exciter coils 5, wherein, for the insulator 2, it is expedient to use in particular an injection molding process in the thermoplastic or thermo-setting plastic process. In the case of such a process, the intermediate elements 21 may be placed in already prior to the injection molding process, whereby it is possible to realize an optimum thermal transition between stator/coil and intermediate element 21, 31 in the most straightforward manner possible. It is also possible for additional heat-conducting elements 28 to be arranged between intermediate element 21, 31 and exciter coil 5.

Figure 6:
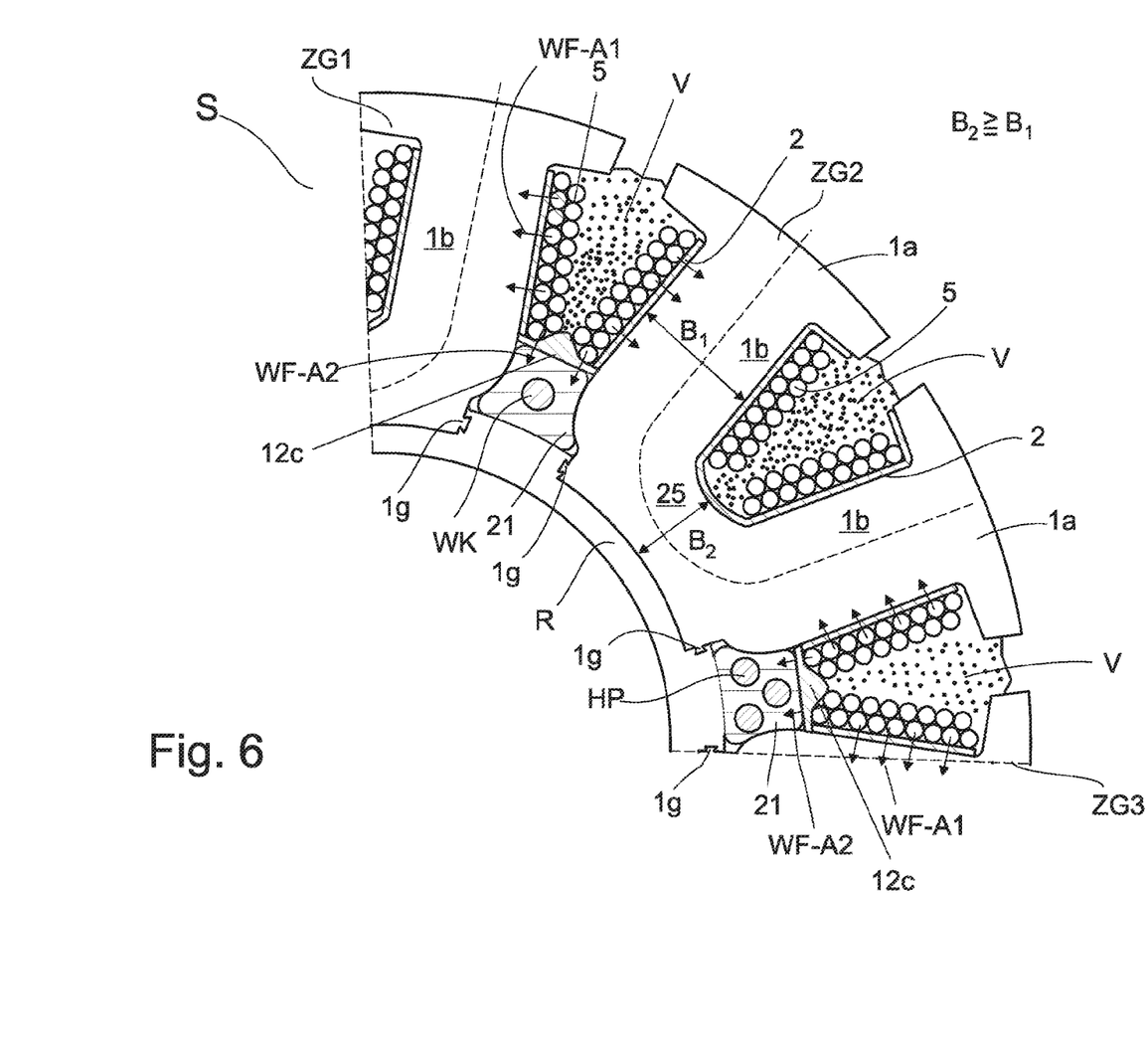
FIG. 6: shows a further possible embodiment, wherein the stator teeth of a tooth group are formed in one piece and form a U-shaped yoke, wherein the yoke are fastened by means of dovetail guides to an inner ring.

FIG. 6 shows a further possible embodiment of an internal stator S according to the invention, in the case of which the U-shaped yokes, which are formed by the stator teeth 1 and the magnetic returns 25 that connect these to one another, are fastened by means of dovetail guides 1g to the inner ring R or are pushed onto the ring R into the corresponding recesses thereof in an axial direction in relation thereto. It is illustrated here by way of example that it is also possible for more than one heatpipe HP to be arranged in an intermediate element 21, whereby the heat dissipation in an axial direction can be considerably increased.

Figure 7:
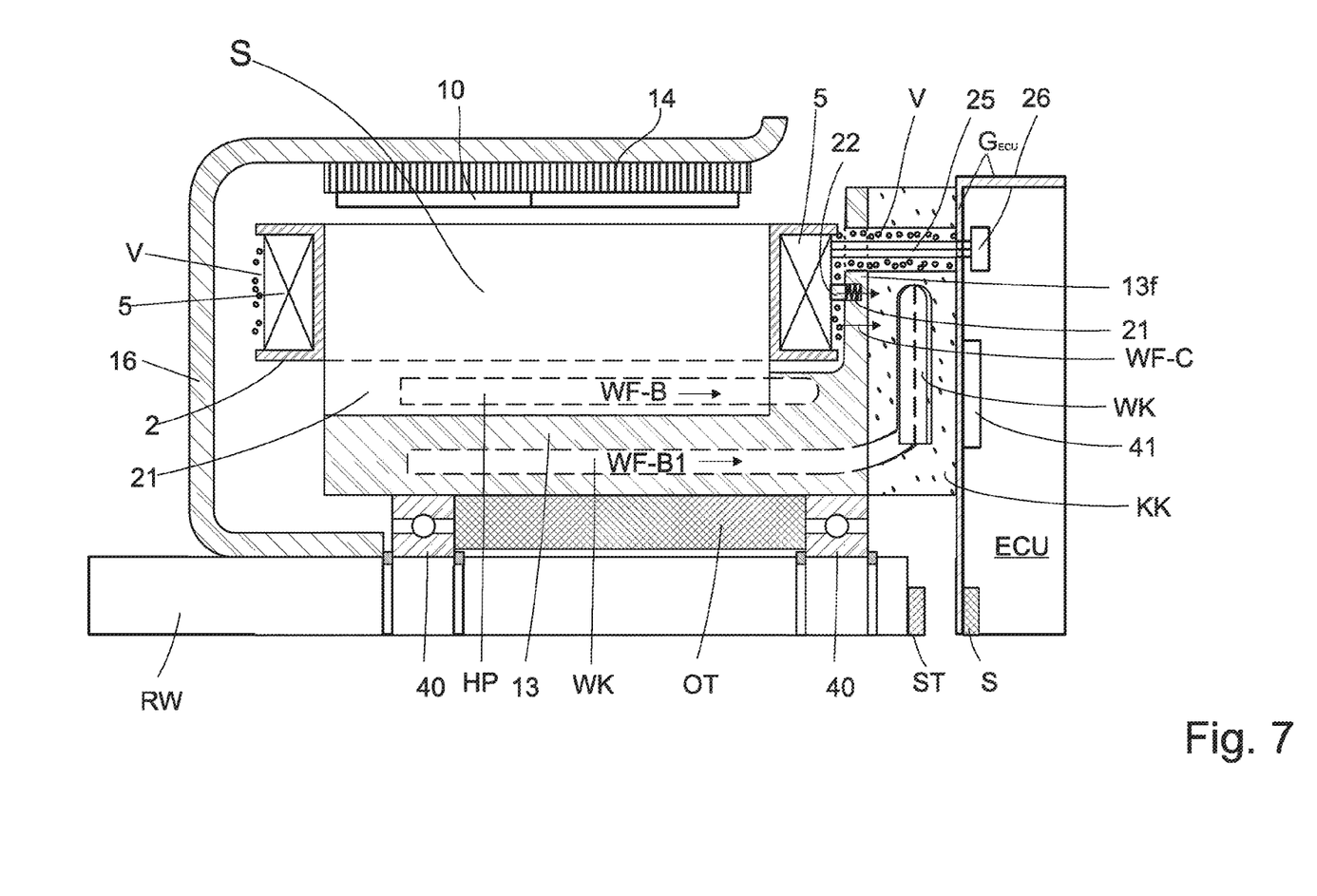
FIG. 7: shows a cross-sectional illustration through a rotating-field machine with external rotor and internal stator, with multiple axial heat-conducting paths.

FIG. 7 shows a longitudinal section through a rotating-field machine according to the invention with multiple possible cooling paths WF-B, WF-B1 and WF-C. The cooling path WF-B is formed by a water-type cooling arrangement WK or a heatpipe and is arranged in an intermediate element 21, 31, 31' as illustrated and described in FIGS. 1 to 4. The heat path WF-B1 may be formed by a water-type cooling arrangement WK which extends through the inner ring R, OT of the internal stator S, as illustrated in FIG. 6. Arranged between the ECU and the internal stator S is a cooling body or heat exchanger KK which releases the heat dissipated via the water-type cooling arrangement or heatpipes to the surroundings or heat sink. A further cooling or heat dissipation path WF-C arises as a result of the bearing of the potting compound V at the end side against the stator carrier 13, which likewise bears against the cooling body KK over a large area. The pot-shaped rotor 16 is produced preferably in a deep-drawing process and is fastened to the shaft RW, which in turn is supported via the bearing 40 on the stator carrier 13. The rotor has a laminated external stator 14 and permanent magnets 10 arranged thereon. On the end side of the rotor shaft RW, there is arranged a sensor target STA, the rotation of which is detected by a sensor SE which is arranged in the housing of the ECU. The power electronics 41 are arranged on the housing wall of the ECU such that the heat thereof is dissipated directly to the cooling body KK. Via the connector 26 and the line 25, the exciter coils 5 are connected to the ECU.

Figure 8:
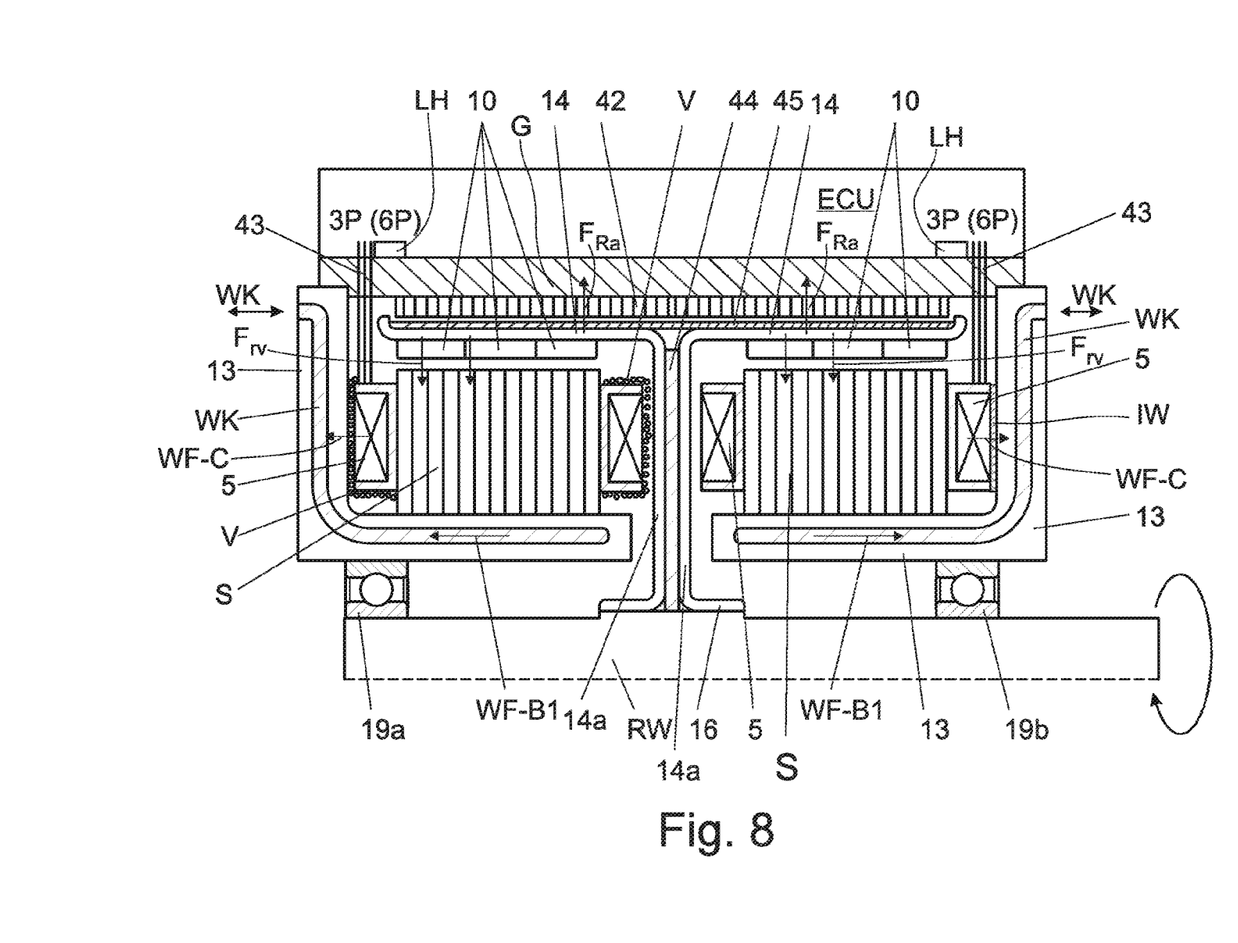
FIG. 8: shows a double-pot rotating-field machine with two internal stators with axial heat dissipation.

FIG. 8 shows a double-pot rotating-field machine with two internal stators S with standard stators without intermediate elements, with axial heat dissipation via the heat path WF-C at the winding head and WF-B1 in the stator carrier by way of the heat-conducting means 1W, 22 and 23 described in FIGS. 1 and 2, and an additional water-type cooling arrangement WK by means of the water channels arranged in the stator carrier and stator. The above-described heatpipes HP may self-evidently also be used in this rotating-field machine. This also applies to axial cooling via intermediate elements in the stator (WF-B).

Furthermore, two alternatives of the winding head cooling arrangement are illustrated. The left-hand stator is, at the end side, separated from the stator carrier 13 and potting only by a small spacing, whereas the heat-conducting means 1W and optionally the variants (not shown) of the heat-conducting means 22 and 23 are used on the right-hand stator.

The heat dissipation from the stator thus occurs almost exclusively axially to the left-hand and right-hand end sides. For optimized heat management, the ECU is inserted above and parallel to the electric motor. This yields an optimum heat distribution, because the ECU is not heated by the stator, and it is thus possible for the housing (G) of the motor and the exterior region to be utilized as a heat sink of the ECU.

The rotor 16 of this double-pot rotary machine is composed of 2 ferromagnetic deep-drawn parts 16 and of a driver 44 which is connected to the shaft and to which the deep-drawn parts are connected preferably by means of welded connections. The shaft is supported in the stator carriers 13 by means of 2 bearing arrangements which are situated far apart from one another, whereby the stator is made very stiff and can withstand high rotational speeds. Fragmented permanent magnets are attached to the inner side of the rotors 16. The fragmentation is used to minimize the magnetic losses. The rotor is furthermore bandaged with a glass or carbon fiber band and is thus configured for high loads.

The return of the magnetic circuit is realized via a stator return assembly 42 fastened in the housing G. The rotor thus has 2 air gaps. This doubled air gap duly leads to an impairment of the magnetic circuit but has the effect of relieving the load on the rotor, because the rotor is not only loaded radially with force $F_{Ri}$ on one side by the stator but also has a force vector $F_{Ra}$ in the direction of the return laminated core. Thus, the radial force acting on the rotor can be reduced, and even a thin-walled rotor can withstand very high rotational speeds. The centrifugal force acting owing to the rotational speed can be balanced in an effective manner, such that, at the design point of the nominal power, the radial loading of the rotor is optimized. Furthermore, a bandage of the rotor composed of a thin-walled glass-carbon fiber band with high load capacity is of assistance at maximum power, that is to say very high rotational speeds, where the centrifugal forces are again dominant. It is thus possible for the motor to be configured to be very stable over the entire load collective (nominal power, maximum power).

In relation to the embodiment in FIG. 7, it is also the case that the external-rotor motor is not subjected to any unilateral loading and is much stiffer and thus suitable as a power motor with very high rotational speeds, in particular as a traction motor of electric vehicles with very high power.

Additionally, each stator has a 3-phase or 6-phase contact arrangement. A 6-phase contact arrangement is composed of in each case two phase strands. It is thus possible for twofold redundancy to be achieved because, in the event of failure of 3 phases of one side, half of the torque remains available. In the case of a 2×6-phase configuration, in the event of a failure of one 3-phase strand, approximately 75% of the torque remains available. This satisfies the requirements on autonomous vehicles with only one electric drive motor.

Figure 9:
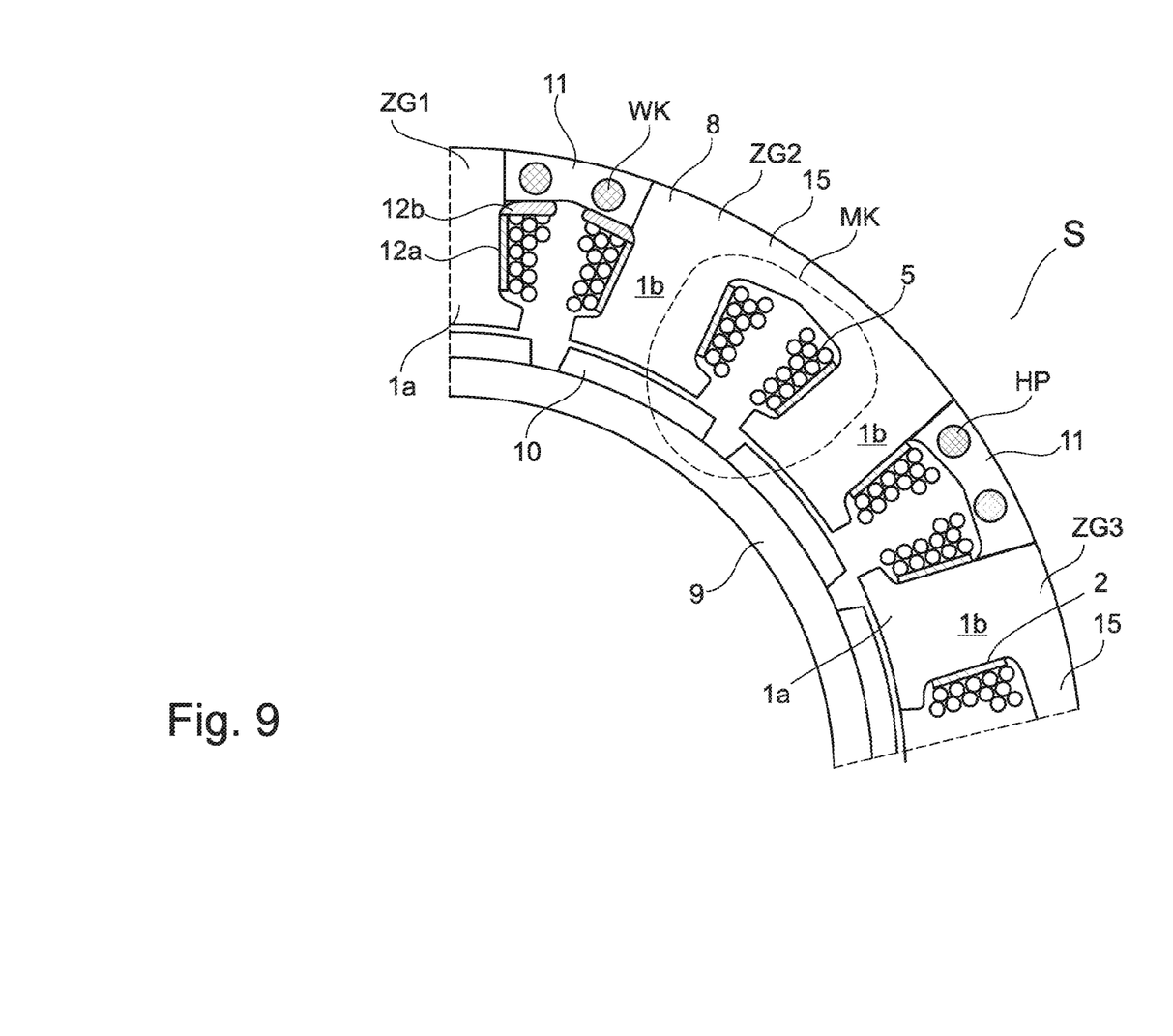
FIG. 9: shows an external stator according to the invention with axial heat-conducting means.

FIG. 9 shows one possible embodiment of an external stator with axial heat-conducting means. In this embodiment, too, the heat-conducting means as illustrated and described in FIGS. 1 and 2 may additionally be used. The external-yoke stator S illustrated in FIG. 9 has stator teeth 1, wherein in each case two adjacent stator teeth 1 form in each case one tooth group $ZG_i$. Here, a tooth group ZG is substantially U-shaped in cross section, wherein the individual tooth groups $ZG_i$ are held with a spacing or in position relative to one another, and/or may be or are connected to one another, by means of intermediate elements 11.

The intermediate elements 11 have the task of increasing the cooling power and are thus advantageously composed of a material with good thermal conductance. If the intermediate element 11 is composed of an electrically conductive material, it must also be separately insulated in relation to the coil 5, which may be realized for example by means of the element 12b. The weight can furthermore be reduced by means of the intermediate element 11. Also, the heat conduction may occur directly from the coil 5 to the intermediate element 11 if the element 12b has good thermal conductivity. An advantage of these intermediate elements 11 is that, here, a material can be used which has much more favorable thermal conductances than the stator lamination situated there in the standard case. Further parallel heat paths S and ST are thus realized instead of only from the coil 5 to the stator tooth 1 and from there to the housing of the rotating-field machine.

Here, each stator tooth 1 is composed of the pole core 1b and the integrally formed pole shoe 1a, wherein the stator teeth 1 of a tooth group $ZG_i$ are connected to one another by the magnetic return means 15. Here, the stator teeth 1 of a tooth group may be formed by U-shaped stator laminations. The coils 5 are electrically insulated from the stator teeth 1 by means of a suitable insulator 2, 12a, wherein the insulator 2 or the heat-conducting means 12a can serve for the dissipation of heat from the coils in the direction of the stator tooth 1.

The stator teeth 1 and magnetic returns 15 are manufactured from a first, in particular ferromagnetic material MA1. The intermediate elements 11 are manufactured from a second, different material MA2, which is in particular lighter and/or has better conductance than the first material MA1. The stator teeth of a tooth group form, together with their magnetic return element 15, a U-shaped yoke, which forms a part of the magnetic circuit MF.

The internal rotor 9 is, by way of example, equipped with permanent magnets 10.

The intermediate elements 11 may optionally form channels for a water-type cooling circuit WK or may be equipped with integrated heatpipes HP. The heatpipes HP may also be formed by molded elements with very good heat conductivity, for example copper pins. The axial heat conduction in particular is optimized by means of said pins, which can be advantageously utilized in the configuration of an internal-rotor motor for the distribution of heat.

The invention claimed is:

1. A rotating-field machine, including:
an external rotor;
at least one stator, the at least one stator bearing multiple exciter coils and including a number, N, of stator teeth and intermediate elements arranged between the stator teeth, wherein the intermediate elements are arranged to connect the stator teeth to one another and extend in an axial direction of the stator along the stator teeth, wherein the intermediate elements are configured to conduct heat out of the stator in the axial direction of the stator, wherein the intermediate elements are manufactured from a first material and the stator teeth are manufactured from a second material, the first material being different from the second material, the second material having a thermal conductivity of greater than 100 W/mK;
at least one heat-conducting means arranged to dissipate heat in the axial direction, wherein the at least one heat-conducting means lies against an end side of at least one of the multiple exciter coils, against a potting compound or insulator surrounding the at least one of the multiple exciter coils, and comprises a structure distinct from the potting compound or insulator; and
a heat sink, in the form of a stator carrier, a cooling body and/or a housing, which is connected to the at least one head-conducting means to dissipate the heat;
wherein:
at least one of the intermediate elements has at least one intermediate element heat-conducting means, in the form of a water channel of a water-type cooling arrangement or of a heat pipe arranged within the at least one of the intermediate elements, wherein the at least one intermediate element head-conducting means extends in the axial direction of the stator and serves to conduct heat in the axial direction, and/or
wherein an inner ring is inserted or arranged inside the at least one stator, either radially on an inside of tooth groups formed by the stator teeth and webs connecting the tooth groups or on an inside of a ring to which the stator teeth are fastened at inner ends of the stator teeth, whereby heat transfer from the stator to the inner ring is enabled, and wherein active cooling via a fluid or passive cooling via heat pipes is arranged within the inner ring.

2. The rotating-field machine as claimed in claim 1, wherein the at least one heat-conducting means is forced against at least one of the multiple exciter coils by means of a spring, wherein the spring is supported against the stator carrier, the cooling body or housing.

3. The rotating-field machine as claimed in claim 1, wherein the at least one heat-conducting means is enabled to be pressed against the at least one of the multiple exciter coils by means of a screw thread, and thereby screwed into a bore with internal thread of the stator carrier, the cooling body or the housing.

4. The rotating-field machine as claimed in claim 1, wherein the second material is aluminum or magnesium or an alloy of aluminum or magnesium.

5. The rotating-field machine as claimed in claim 1,
wherein each stator tooth has one respective pole core and one respective pole shoe integrally formed thereon, wherein the pole cores are manufactured from the first material,
wherein a respective one of the tooth groups is formed by two directly adjacently arranged stator teeth, which, together with a magnetic return, are constituent parts of a magnetic circuit, and
wherein, between two adjacent stator teeth of two adjacent tooth groups, there is arranged in each case at least one of the intermediate elements.

6. The rotating-field machine as claimed in claim 1, further including at least one heat-conducting element arranged between at least one exciter coil of the multiple exciter coils and a stator tooth of the N stator teeth, wherein the at least one heat-conducting element is in contact with at least one of the intermediate elements, and wherein the at least one heat-conducting element is or has plastic, aluminum oxide or nitride ceramic or silicon carbide or boron nitride and/or has a thermal conductivity of $\lambda > 5$ W/mK.

7. The rotating-field machine as claimed in claim 6, wherein the at least one heat-conducting element is arranged for radial dissipation of heat radially inward from an exciter coil of the multiple exciter coils to at least one of the intermediate elements,
wherein the at least one heat-conducting element comprises a plate-like cooling body that extends in the axial direction of the stator and that has a thermal conductivity of greater than 5 W/mK.

8. The rotating-field machine as claimed in claim 1, wherein space between windings forming the exciter coils in winding grooves is potted with a potting compound with a heat conductivity of at least 0.25 W/mK such that there are substantially no air inclusions between coil wires of the windings.

9. The rotating-field machine as claimed in claim 1, further including
at least one channel that extends in an axial direction parallel to the stator teeth, for a water-type cooling arrangement and/or heat pipe, wherein the at least one channel is arranged in or on the stator carrier.

10. The rotating-field machine as claimed in claim 1, wherein the rotating-field machine comprises two stators of the at least one stator and the external rotor, wherein the external rotor includes at least one connecting means that extends radially between the two stators, and which is connected rotationally conjointly to a rotor shaft, directly or indirectly via one or more collars, wherein, on the connecting means, there is integrally formed or fastened at least one cylindrical wall that bears permanent magnets on an inner side.

11. The rotating-field machine as claimed in claim 10, wherein the connecting means of the rotor is produced in a deep-drawing process and is composed of a ferromagnetic material and is of thin-walled form, thinner than 3 mm.

12. The rotating-field machine as claimed in claim 10, wherein the external rotor is surrounded by a radially external, laminated magnetic return, wherein air gaps are present both between pole shoes of the two stators and the permanent magnets of the external rotor and between the external rotor and the magnetic return.

13. The rotating-field machine as claimed in claim 10, wherein the exciter coils of each stator of the rotating-field machine are connected via one or two 3-phase connections to respective power electronics circuits such that, in the event of a failure of one of the power electronics circuits or of one of the exciter coils, 50% to 75% of a maximum torque still remains available.

14. The rotating-field machine as claimed in claim 1, further comprising:
 a stator carrier; and
 a housing of the rotating-field machine,
 wherein the stator carrier is arranged or fastened to the housing of the rotating-field machine directly or via an intermediate part comprising a cooling body arranged on the stator carrier.

15. The rotating-field machine as claimed in claim 14, wherein heat dissipation takes place from the at least one stator to the cooling body or housing via the intermediate elements and/or a water-type cooling arrangement and/or heat pipes.

16. The rotating-field machine as claimed in claim 14, further including an electronics module (ECU), wherein components of the ECU, or the ECU itself, is/are connected to the cooling body, wherein the cooling body is arranged between the ECU and the at least one stator or the stator carrier.

17. The rotating-field machine as claims in claim 1, wherein the at least one connecting means is connected rotationally conjointly to the shaft indirectly via at least one collar.

18. A rotating-field machine including:
 two stators, wherein each stator bears multiple exciter coils;
 an external rotor; and
 at least one connecting means that extends radially between the two stators, and which is radially conjointly connected to a shaft of the rotating-field machine, either directly or indirectly via one or more elements, wherein, on the at least one connecting means, there is integrally formed or fastened at least one cylindrical wall that bears permanent magnets on an inner side,
 wherein the rotating-field machine includes at least two features selected from the group consisting of:
 (a) at least one heat-conducting means configured to dissipate heat in an axial direction, wherein the at least one heat-conducting means lies against an end side of at least one of the exciter coils or against a potting compound or insulator surrounding at least one of the exciter coils, and wherein the heat-conducting means is further connected to a heat sink in the form of a stator carrier, a cooling body, and/or a housing, to dissipate heat;
 (b) intermediate elements arranged between stator teeth of at least one of the two stators, wherein the intermediate elements are arranged to connect the stator teeth to one another and extend in an axial direction of the at least one stator along the stator teeth, wherein the intermediate elements are configured to conduct heat out of the stator in the axial direction, and wherein the intermediate elements are composed of a different material from a material of which the stator teeth are composed;
 (c) at least one inner ring arranged to reinforce and/or to cool at least one of the two stators, either wherein the at least one inner ring is inserted or arranged to rest radially against tooth groups and webs of the at least one stator or wherein stator teeth are fastened to the at least one inner ring with their ends, and wherein active cooling using a fluid or passive cooling using heat pipes is arranged in the at least one inner ring; and
 (d) the external rotor is surrounded by a radially external laminated magnetic return means, wherein an air gap exists both between pole shoes and the permanent magnets of the external rotor and between the external rotor and the radially external laminated magnetic return means.

19. The rotating-field machine as claimed in claim 18, wherein at least one of the intermediate elements contains at least one intermediate element heat-conducting means in the form of a water channel of a water-type cooling arrangement or of a heat pipe, wherein the intermediate element heat-conducting means extends in an axial direction of the stator and is configured to dissipate heat in the axial direction of the stator.

20. The rotating-field machine as claimed in claim 18, wherein the exciter coils of each of the two stators are connected via one or two 3-phase connections to a respective power electronics circuit such that, in an event of failure of one of the power electronics circuits or of one exciter coil, a torque still remains available.

21. The rotating-field machine as claimed in claim 20, wherein in the event of failure of one power electronics circuit or of one exciter coil, 75% of a maximum torque remains available.

\* \* \* \* \*